Figure 1:
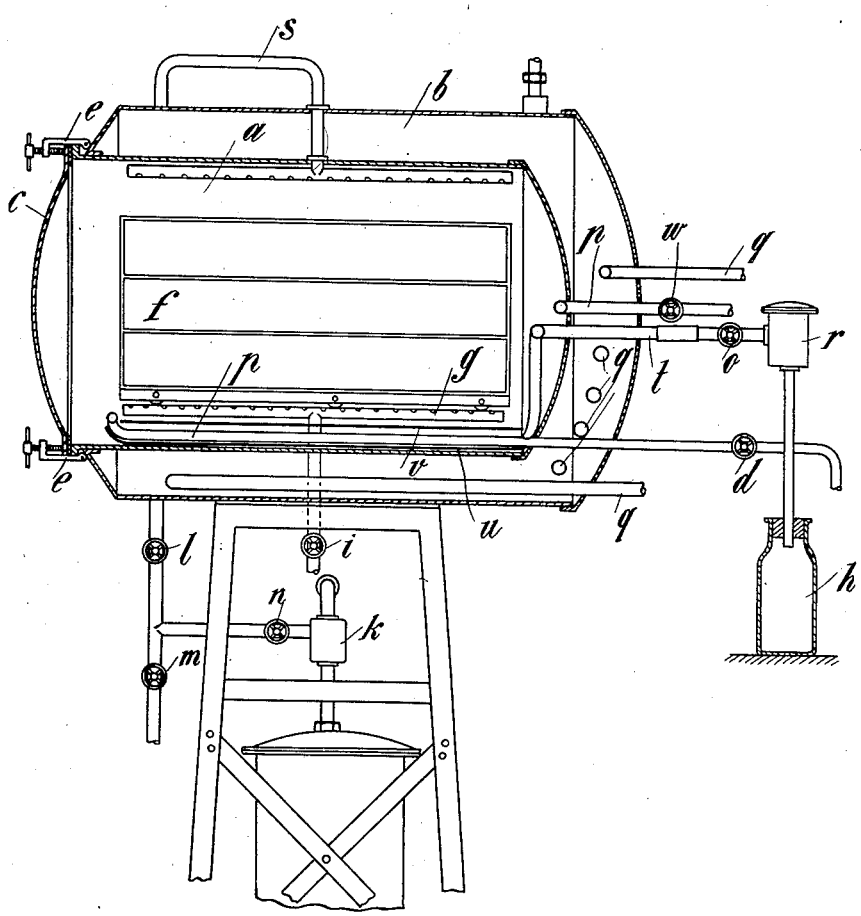

A. GÄRTNER.
PROCESS OF DISINFECTION.
APPLICATION FILED JULY 17, 1906.

903,853.

Patented Nov. 17, 1908.

2 SHEETS—SHEET 1.

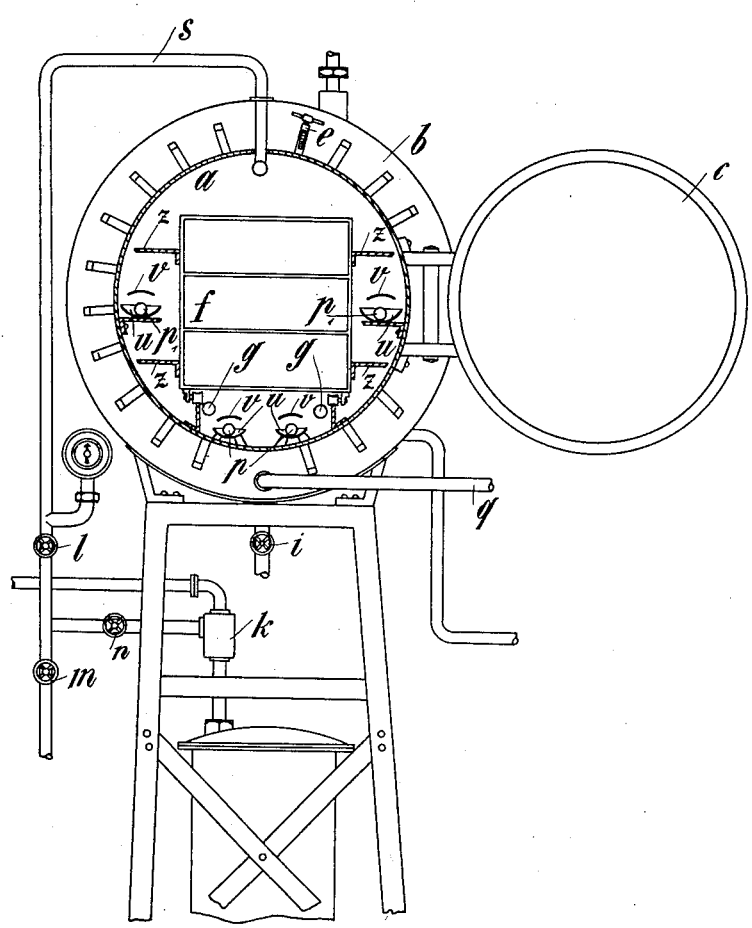

UNITED STATES PATENT OFFICE.

AUGUST GÄRTNER, OF JENA, GERMANY, ASSIGNOR TO AUGUST SCHERL, OF BERLIN, GERMANY.

PROCESS OF DISINFECTION.

No. 903,853.  Specification of Letters Patent.  Patented Nov. 17, 1908.

Application filed July 17, 1906. Serial No. 326,567.

*To all whom it may concern:*

Be it known that I, AUGUST GÄRTNER, doctor of medicine and professor at the University of Jena, a subject of the Grand Duke of Saxe-Weimar, residing at Jena, in the Grand Duchy of Saxe-Weimar, German Empire, have invented a certain new and useful Process of Disinfection, of which the following is a specification.
No process has hitherto been known for effecting the disinfection of books, manuscripts and the like in such manner as to destroy the infectious germs contained therein, to the same perfect extent and with the same reliability as is the case with the disinfection of dwellings by means of gaseous formaldehyde, without detrimental action to the print, paper or binding and without imparting thereto an unpleasant odor. It has been ascertained by experiment that a sufficient disinfection of books and the like can be effected by subjecting them for about 24 hours to a temperature of about 70° C. but such a process is not practically useful in view of the fact that the long exposure to so high a temperature must necessarily act injuriously upon the books.

The use of substances that are usually employed as disinfectants such as gaseous formaldehyde, sulfurous acid, carbon bisulfid, essential oils, acetic acid, and the like, is also not possible for the above purpose, on account of the more or less unpleasant penetrating odor which clings to the books after such treatment, while sulfurous acid, hydrogen peroxid, and others of these disinfectants also act injuriously upon the books.

According to my present invention the disinfection of books and other documents is effected by means of a mixture of methyl- or ethyl-alcohol with aqueous vapor. I have discovered that by treating books with this mixture at a temperature of from 50° to 65° C. during only 1½ hours all requirements are satisfied for effecting a perfect disinfection with avoidance of detrimental action or the imparting of unpleasant odors, while at the same time the process is simple, practically applicable, and comparatively inexpensive so as to allow of its general use. Furthermore I have found that besides the necessity of a temperature from 50° to 65° C. it is necessary to exhaust the disinfecting chamber of air to a very high degree before introducing the disinfectant, because it is only by first removing the air that it is possible to cause the disinfecting vapors replacing the same to penetrate effectually into the books, while at the same time the cohesion of the separate leaves is almost entirely done away with thereby. Furthermore, it was found that for effecting a complete disinfecting action a very rapid admission of large quantities of the vaporous mixture was necessary, on which account the vapors are generated by heating the alcohol and water mixture in a separate vessel.

I will describe the method of carrying out the process and the apparatus employed for the purpose with reference to the accompanying drawings in which Figure 1 shows a longitudinal section and Fig. 2 a cross section of the apparatus. This consists of a receptacle $a$ serving as disinfecting chamber which is closed airtight by means of a cover $c$ with rubber packing and screws $e$, and is provided with heating pipes $p$ $p'$. The vessel $a$ is surrounded by a jacket $b$ filled with water, which is heated by pipes $q$; it communicates with a suction pump $k$ by means of a pipe $s$ which is perforated within the vessel, along the top of which it extends, so that the air can be exhausted from the vessel by the pump. The vessel is also connected by a pipe $t$ with a vessel or boiler $h$, adapted to be heated by suitable means, such as a hot water bath, (not shown), and containing a mixture of alcohol and water. Pipe $t$, is provided with a condenser $r$, which permits the steam and alcohol vapors, condensed in said pipe, to return into vessel $h$, so that dry vapors only will enter vessel $a$. Pipe $t$ is branched at its entrance into the vessel $a$, the branches being led both along either side at the middle of the vessel's height and downwards along near the bottom on each side of the center line. The branches open into troughs $u$ containing heating pipes $p$ and $p'$ supplied with steam from the outside, above which are arranged shield plates $v$ to prevent the splashing of the liquid. This arrangement serves for effecting a very uniform distribution in the chamber first of the vapor mixture and then of the liquid mixture, and also to effect the rapid evaporation of the liquid mixture by the heating pipes $p$ $p'$.

The chamber $a$ can communicate with the outer air through two pipes $g$ perforated at top and connected to a downward extending branch pipe with cock $i$, all the other pipes being also provided with stop cocks.

The charging of the vessel with the books or other objects to be disinfected is effected by means of a sliding frame $f$ having a number of superposed partitions, in which the books are so placed upon their backs that the leaves open out. The bottom surfaces of the partitions are formed of wire netting in order to facilitate the circulation of the vapors.

The charged frame is slid into the disinfecting chamber which has been previously heated by heating the water in the jacket of the apparatus by means of the heating pipes $q$. The apparatus is then closed air tight by the cover by means of the screws $e$, only the cock $i$ of the air inlet being slightly opened for equalizing the external and internal pressures. When the thermometer in the vessel indicates a temperature of about 50°, the cock $i$ is quite closed, and on opening the cocks $l$ and $n$, and closing the cock $m$ the air is exhausted from the apparatus by means of the suction pump $k$ until the pressure gage indicates a vacuum of 700 mm. whereupon cock $l$, and $n$, are closed. Meanwhile a mixture of alcohol such as methyl alcohol or ethyl alcohol and water, preferably in the proportion of about 100 parts by volume of 96% alcohol to 80 parts of water in quantity dependent upon the number of books has been heated to the boiling point in the vessel $h$, by means of a water bath, and after the exhausting of the chamber the vessels $h\ r$ are made to communicate directly therewith by opening the cock $o$ so that the mixed vapors of alcohol and water, which are generated in large quantity enter rapidly the disinfecting chamber.

The cocks $w$ and $d$ are then opened and steam is introduced into the pipes $p$ and $p'$ lying in the evaporating troughs $u$; the condensed water flowing off through the cock $d$. The heating pipes will have become hot in about three minutes, after which the developing vessel $h$ is raised so as to cause the large remaining amount of the liquid mixture therein to flow into the apparatus, whereupon the cock $o$ is closed. The liquid is conveyed through the several branch pipes of $t$ into the four troughs $u$ where it is completely evaporated in a short time by contact with the heating pipes. Cock $w$ is then completely closed and cock $d$ nearly so.

About 20 minutes after the completion of the evaporation, air is admitted into the vessel by simultaneously opening the cock $i$ of the air inlet pipe at the bottom of the vessel and the cocks $l$ and $m$ of the exhaust pipe $s$ at the top of the vessel, cock $n$ being closed. After the equalization of the pressure has been effected, the three exhaust cocks are completely closed and the air inlet cock $i$ is nearly closed.

The temperature in the disinfecting chamber is maintained as constant as possible by carefully regulating the heating.

After about 1½ hours from the commencement of the introduction of the alcohol and water vapor, the air inlet cock $i$ and exhaust cocks $l$ and $n$ are fully opened, and during half an hour a strong current of air is drawn in an upward direction through the chamber, the air being caused by the baffle plates $z$ to pass through and between the books. The apparatus is then opened and the frame $f$ is drawn out and the disinfected books are removed therefrom. The books are then preferably subjected to pressure for a short time.

Bacteriological investigations have shown that the disinfection of the books is perfect. The bacilli of typhus, diphtheria, cholera, and tuberculosis, as also the coccus of pus and the like, are effectually destroyed.

Ethyl alcohol can be replaced in the above process by methyl alcohol, and partially also by thymol or menthol; it is also possible to partially regain the alcohol by condensation of the vapors drawn off from the chamber.

What I claim and desire to secure by Letters Patent of the United States is:

Process of disinfecting books and similar articles, which consists in subjecting the same within a closed vessel to a vacuum at a temperature of about 50° to 65° C., treating them within said evacuated chamber with a mixture of steam and the vapor of methyl alcohol, by first admitting said mixture into the chamber, then introducing a mixture of water and methyl alcohol and vaporizing said second mixture, and finally passing a current of air through the chamber, substantially as specified.

In witness whereof I have hereunto signed my name in the presence of two subscribing witnesses.

AUGUST GÄRTNER.

Witnesses:
PAUL TEICHMANN,
ANNE B. SLOCUM.